June 16, 1964 W. H. KROLL 3,137,162
MATERIAL TESTING BY ULTRASONIC FLAW DETECTION
Filed Dec. 27, 1960 2 Sheets-Sheet 1
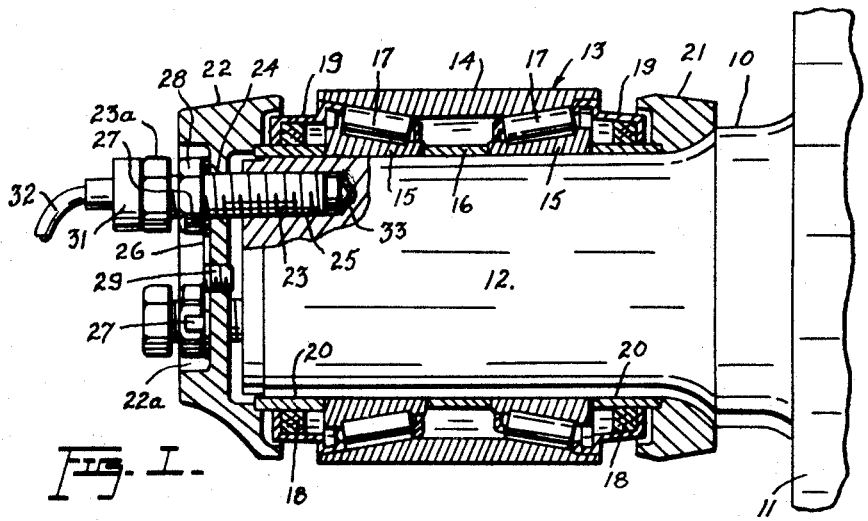
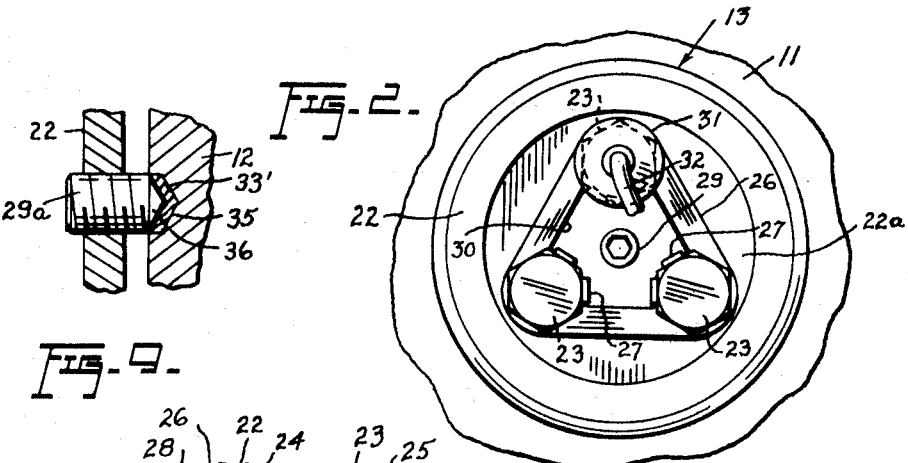
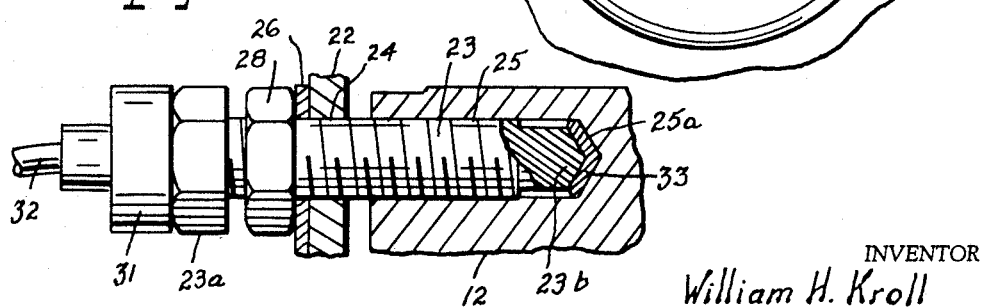
INVENTOR
William H. Kroll
BY
ATTORNEY

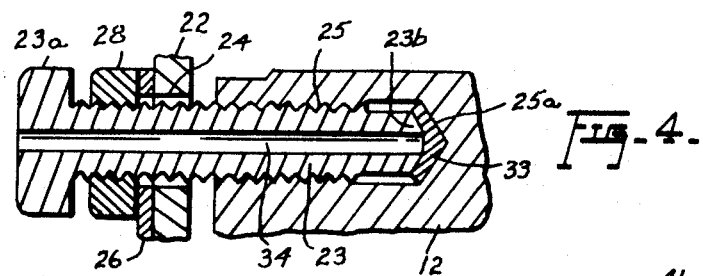
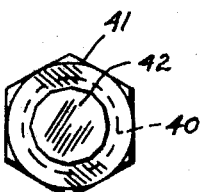
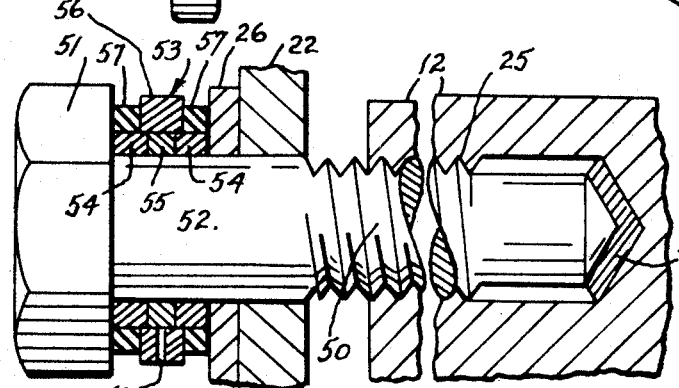
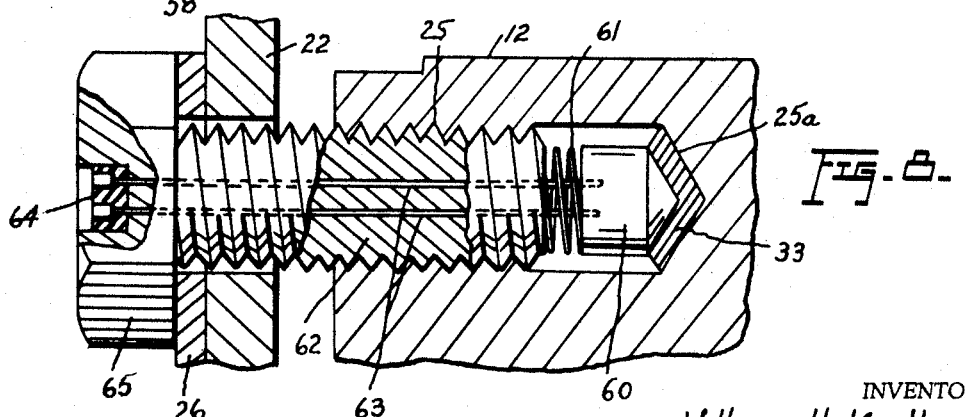

United States Patent Office 3,137,162
Patented June 16, 1964

3,137,162
MATERIAL TESTING BY ULTRASONIC
FLAW DETECTION
William H. Kroll, % Orinoco Mining Co., Puerto Ordaz,
Estado Bolivar, Venezuela
Filed Dec. 27, 1960, Ser. No. 78,655
9 Claims. (Cl. 73—71.5)

This invention relates to new and useful improvements in the art of material testing, particularly by ultrasonic detection of flaws. In such testing procedure, an electromechanical transducer is used to couple a source of ultrasonic energy to a material specimen under test and difficulties are often encountered when the structural environment of the specimen is such as to present an obstacle to bringing the transducer in contact with the specimen. For example, if the test specimen is a railroad car axle equipped with roller bearing journals and end caps on the journals, the end caps prevent a transducer from being brought in contact with the ends of the axle and, as a result, the end caps must be removed before the testing procedure can be undertaken.

It is, therefore, the principal object of the invention to eliminate this difficulty, this being attained by the provision of means whereby the necessary contact between the transducer and the test specimen is effected through the structural obstruction and whereby the test may be carried out without the obstruction being removed.

Another important feature of the invention resides in an arrangement of the aforementioned means whereby one or more fastening elements such as bolts, studs, screws, et cetera, which ordinarily serve to retain the obstruction in place in the structural assembly of the test specimen are also used to carry the transducer and/or to transmit ultrasonic energy from the transducer to the specimen through the obstruction.

Some of the advantages of the invention reside in its extremely simple structural arrangement, in its efficient and dependable operation, and in its adaptability for use in testing various different specimens in addition to the axle mentioned above.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a fragmentary view, partly in elevation and partly in vertical section, of a railroad car axle journal equipped with roller bearings and an end cap, the arrangement of the invention being shown in situ;

FIGURE 2 is a fragmentary end elevational view of the device shown in FIGURE 1;

FIGURE 3 is an enlarged fragmentary detail of the cap retaining stud or cap screw with the transducer applied thereto;

FIGURE 4 is a fragmentary sectional detail of a modified cap screw arrangement;

FIGURE 5 is a plan view of another modified screw;

FIGURE 6 is an end view of the screw shown in FIGURE 5;

FIGURE 7 is an enlarged fragmentary detail showing another modified arrangement of the invention;

FIGURE 8 is an enlarged fragmentary sectional detail of another modified arrangement; and FIGURE 9 is a fragmentary sectional detail showing a modified arrangement of a cap plug.

Referring now to the accompanying drawings in detail, more particularly to FIGURES 1–3 inclusive, the reference numeral 10 designates a conventional railroad car axle provided with a wheel 11 and having a journal 12 equipped with an anti-friction bearing 13. The latter is of a conventional arrangement and includes an outer bearing cup or race 14, inner bearing cones or races 15, 15 with a spacer 16 therebetween, and sets of rollers 17, 17 between the outer and inner races. Also in accordance with conventional practice, suitable seals 18, 18, are provided at the opposite sides or ends of the bearing 13, such seals being contained in retainers 19, 19 and engaging wear rings 20, 20 on the journal 12. The ring 20 at the inside of the bearing 13 abuts a backing ring 21 on the journal while the ring 20 at the outside of the bearing is abutted by an end cap 22. The end cap is held in place by a plurality of cap screws 23 which extend through circular holes 24 in the end cap into screw-threaded bores 25 provided in the end of the journal. A locking plate 26 is provided between the cap 22 and the heads 23a of the cap screws when, in conventional practice, the cap screws are tightened against the cap, such locking plate having deformable ears or lugs 27 which are bent to lie against the sides of the cap screw heads to prevent the screws from loosening. In the invention, the lugs 27 of the locking plate 26 are bent to lie against the sides of lock nuts 28 on the screws 23, as will be hereinafter apparent. Finally, the conventional arrangement also includes a screw-threaded plug 29 provided at the center of the cap 22 and accessible through a central opening 30 in the locking plate 26. In passing it may be noted that the parts are assembled so that the cap 22 is spaced outwardly from the end of the journal 12 and that the outside of the cap is provided with a recess 22a in which the cap screw heads 23a are ordinarily disposed.

Ordinarily, the axle 10 cannot be tested for flaws by ultrasonic detection inasmuch as the end cap 22 constitutes an obstruction which interferes with placing a transducer in contact with the end of the journal 12. Thus, the end cap must be removed before a test can be made, but the present invention eliminates the cap removal and facilitates transmission of ultrasonic energy to the journal through the cap. This is effected by mounting a suitable crystal type electro-mechanical transducer 31 on the head 23a of any one or more of the cap screws 23, the transducer being supplied with electric current through a conductor 32 and producing ultrasonic pulses which are transmitted by the head 23a and the screw shank through the cap 22, more specifically, through the aperture 24 in the cap, to the journal 12, it being noted that this transmission of ultrasonic energy is applied directly to the journal and without necessity for removing the end cap.

In order to increase and make effective the area of contact between the screw 23 and the journal by compensating for imperfections in contact surfaces resulting from burrs, rough machining, and the like, a couplant 33 of plastic material such as lead, for example, is provided between the closed inner end 25a of the bore 25 in the journal and the inner end or tip of the screw 23. Since the inner end 25a of the bore is usually conical, the screw tip 23b is of a similar conical shape, so that when the screw 23 is driven home, the plastic couplant 33 is compressed between the two conical surfaces to provide a good contact medium for transmission of ultrasonic pulses between the screw and the journal. Inasmuch as tightening of the screw against the plastic couplant 33 would not necessarily be accompanied by tightening of the screw head 23a against the cap 22 to hold the cap assembled, the screw 23 is long enough to accommodate the aforementioned lock nut 28. Thus, after the screw is tightened against the couplant, the nut 28 is tightened on the screw against the end cap and an adjacent lug 27 of the locking plate 26 is bent against a side of the lock nut to prevent the same from loosening. It will be apparent that in this manner the screw 23 with the nut 28 functions not only to transmit ultrasonic pulses from the transducer 31 to the journal 12, but also to hold the cap 22 in place.

When the plastic couplant 33 is placed in the closed end 25a of the bore 25, it is compressed by the tip 23b of the screws as already explained. If desired, an open-ended axial passage 34 may be provided in the screw 23 as shown in FIGURE 4, whereby excess material of the plastic couplant may be extruded outwardly through the passage before the transducer is applied to the screw head.

As already noted, transducers may be applied to any one or more of the cap screw heads at either or both ends of the axle for ultrasonic pulse transmission as well as pick-up, and if desired, the aforementioned plug 29 at the center of the cap may be substituted by a similar plug 29a as shown in FIGURE 9, to provide additional coupling facilities between the cap and the journal. In such event the journal is formed with a socket having a conical surface 35 to receive the plastic couplant 33' between the conical surface and a conical tip 36 of the plug 29a.

FIGURES 5 and 6 show a modified cap screw or stud arrangement wherein the stud 40 is equipped with a lock nut 41 and with a head 42, corresponding to the aforementioned nut 28 and head 23a, respectively. However, rather than being hexagonal as usual, the head 42 is twelve-pointed so that considerable wrench torque may be applied thereto without distortion. The head 42 is no larger than the root diameter of the thread of the stud 40, so that the lock nut 41 may be passed over the head and tightened after tightening of the stud. The nut 41 and head 42 may be thinner than usual, so that they are both accommodated in the recess 22a of the end cap 22 without the stud head projecting outwardly therefrom.

FIGURE 7 illustrates a modified embodiment of the invention wherein a lock nut such as the nuts 28 or 41 is not necessary on the cap screw 50 and tightening of the cap screw provides for both, compression of the plastic couplant 33 in the bore 25 as well as tightening of the screw head 51 against the cap 22. In this arrangement the screw 50 has a cylindrical shank portion 52 adjacent the head 51 and a washer assembly 53 is provided on the shank portion 52 between the head 51 and the locking plate 26 on the cap 22. The washer assembly 53 comprises a pair of spaced metallic or other rigid rings 54 with a filler of plastic material 55 therebetween, the latter being covered by an annulus 56 which also overlies or overlaps the rings 54 while two washers 57 of compressible material are provided at opposite sides of the annulus 56, over the rings 54. As the screw 50 is tightened to compress the couplant 33, the screw head 51 causes compression of the filler 55 between the rings 54 and compression of the washers 57, while excess filler material is extruded through one or more radial passages 58 provided in the annulus 56. In this manner, tightening of the screw to compress the couplant 33 will automatically tighten the screw head against the cap 22 without a lock nut being utilized for such purpose. After assembly, the passages 58 may be deformed or otherwise sealed to prevent further extrusion of the filler material.

FIGURE 8 shows another modified embodiment wherein a transducer crystal 60 is mounted by a spring 61 at the tip or inner end of a cap screw 62 which extends through the cap 22 into the bore 25 of the journal. Insulated conductors 63, extending longitudinally in the screw 62, convey electric current to the crystal 60 from an insulated junction block or socket 64 in the screw head 65, and when the screw is tightened so that the head 65 tightens the cap 22 in place, the spring 61 urges the crystal 60 in engagement with the couplant 33 for transmitting ultrasonic pulses to the journal 12. The conductors 63 are flexible and capable of sufficient slack to facilitate compression of the spring 61, and suitable means may be provided to assure rotation of the crystal 60 with the screw 62. Alternatively, the parts may be arranged so that the crystal and conductors remain stationary during rotation of the screw.

The transducer 31 and crystal 60 may be conventional piezoelectric devices.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, such as may lie within the spirit and scope of the invention as claimed.

What is claimed as new is:

1. For use on a railroad car journal box including a journal provided with a blind screw-threaded bore and a journal cover plate having an aperture in register with said bore, a cover plate mounting bolt assembly especially suited for journal testing by ultrasonic pulses, said mounting bolt assembly comprising a screw-threaded bolt member adapted to extend through a cover plate aperture into a blind journal bore, said bolt member having at its outer end a head by which the bolt member may be tightened and to which an electro-mechanical transducer may be applied for transmission of pulses to and from the bolt member, a plastic couplant provided at the inner end of said bolt member and adapted to be pressed against the blind inner end of a journal bore when said bolt member is tightened by said head whereby to maintain a continuous pulse path between the journal and the bolt member, and means provided on said bolt member adjacent said head for engaging and retaining a cover plate in position on the journal independently of the tightening of the bolt member.

2. The device as defined in claim 1 wherein said means comprise a cover plate engaging lock nut provided on said bolt member.

3. The device as defined in claim 1 wherein said means comprise a compressible washer assembly positioned on said bolt member in abutment with said head and adapted to engage a cover plate.

4. The device as defined in claim 1 wherein said bolt member is provided with an open-ended axial passage for extrusion of excess couplant therethrough when the bolt member is tightened.

5. The device as defined in claim 1 wherein said head of said bolt member has a maximum width no greater than the root diameter of the screw-threads of the bolt member, said means comprising a cover plate engaging lock nut positionable on and removable from said bolt member over said head.

6. For use on a railroad car journal box including a journal provided with a blind screw-threaded bore and a journal cover plate having an aperture in register with said bore, a cover plate mounting bolt assembly especially suited for journal testing by ultrasonic pulses, said mounting bolt assembly comprising a screw-threaded bolt member adapted to extend through a cover plate aperture into a blind journal bore, means provided at the outer end of said bolt member for engaging and retaining a cover plate in position, an electro-mechanical transducer provided at the inner end of said bolt member for operatively engaging the blind inner end of the stated bore, and electric conductor means extending longitudinally through said bolt member to said transducer.

7. The device as defined in claim 6 together with a plastic couplant provided on said transducer and adapted to be pressed against the blind inner end of the stated bore.

8. The device as defined in claim 7 together with a compression spring interposed between and connected to the inner end of said bolt member and to said transducer for pressing said couplant against the inner end of the stated bore.

9. The combination of a material specimen to be tested by ultrasonic detection of flaws, said specimen having a portion provided with a blind screw-threaded bore having a closed inner end, structural means associated with said specimen and constituting an obstruction for access to said portion of the specimen, said obstruction being provided with an aperture, a screw extending through said aperture into said bore in the specimen and having a head in abutment with the obstruction for retaining said structural means in situ, an electro-mechanical transducer provided at the inner end of said screw in abutment with the closed end of said bore for transmitting ultrasonic energy to the specimen, and electric conductor means extending through said screw to said transducer.

References Cited in the file of this patent

UNITED STATES PATENTS

| | | |
|---|---|---|
| 2,592,134 | Firestone | Apr. 8, 1952 |
| 2,879,114 | Bowen | Mar. 24, 1959 |